Feb. 28, 1950

L. C. DOWNES ET AL

PULSED LIGHT FILM PROJECTION FOR TELEVISION TRANSMISSIONS 2,499,181

Filed Feb. 28, 1947

2 Sheets-Sheet 1

Inventors:
Lloyd C. Downes,
Joseph F. Wiggin,
by Merton D. Morse
Their Attorney.

Feb. 28, 1950

L. C. DOWNES ET AL
PULSED LIGHT FILM PROJECTION FOR TELEVISION TRANSMISSIONS 2,499,181

Filed Feb. 28, 1947

2 Sheets-Sheet 2

Inventors:
Lloyd C. Downes,
Joseph F. Wiggin,
by Merton D. Moore
Their Attorney.

Patented Feb. 28, 1950

2,499,181

UNITED STATES PATENT OFFICE 2,499,181

PULSED LIGHT FILM PROJECTION FOR TELEVISION TRANSMISSIONS

Lloyd C. Downes and Joseph F. Wiggin, Syracuse, N. Y., assignors to General Electric Company, a corporation of New York Application February 28, 1947, Serial No. 731,472

8 Claims. (Cl. 178—7.2)

Figure 1:
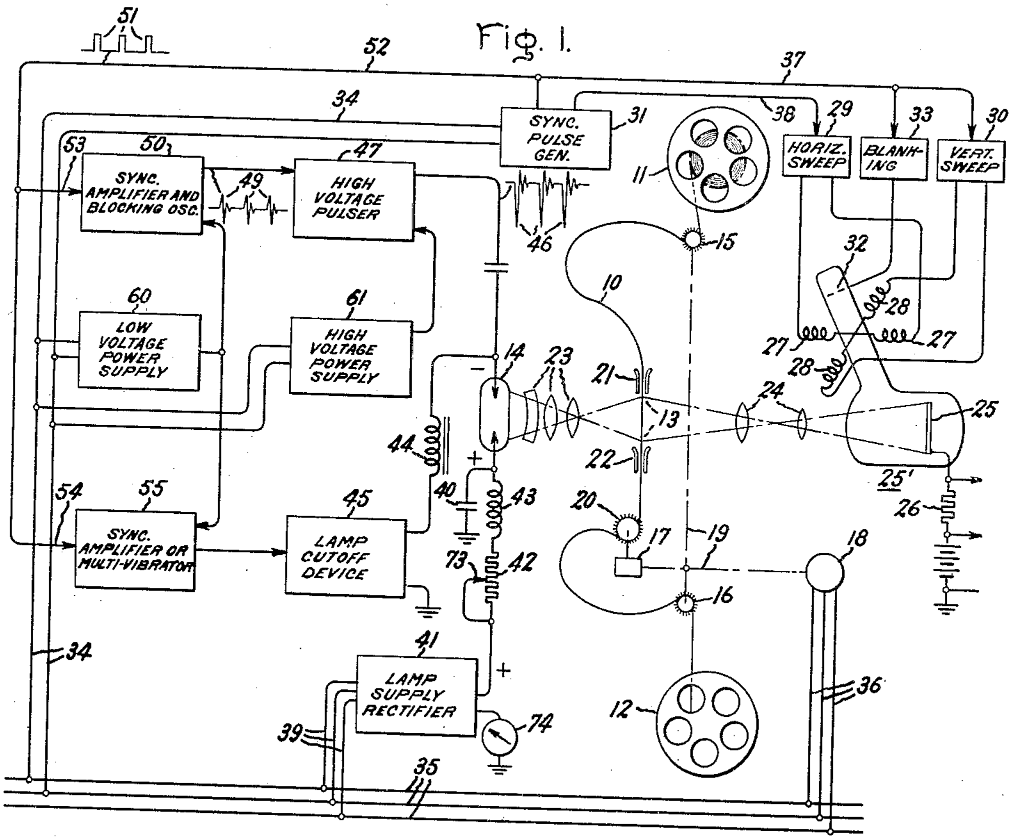

Our invention relates to pulsed light projection systems and has particular application to a light source and circuits for illuminating the motion picture film in a television film projection system.

In current motion picture projection practice, mechanical shutters are utilized to interrupt the illumination of the film at the frame repetition rate of 24 frames per sec. When it is desired to televise a motion picture film, some unusual problems are presented. In the first place, the television field scanning rate, according to present-day standards, is 60 fields per sec., since this provides convenient synchronization with local power distribution systems which normally operate at 60 cycles per second in most sections of this country. Therefore, the 24-frame film rate must be synchronized with the 60-cycle field scanning rate. Various means have been devised for accomplishing this successfully, and this feature forms no part of the present invention. However, a much more severe limitation is the fact that, in present-day television systems utilizing the cathode ray type of camera pick-up tube, the photo-sensitive mosaic or light responsive area of the camera tube must be illuminated with the film image only during the vertical retrace, or vertical blanking intervals. As is well understood in the art, this illumination produces a "charge image" on the light responsive area which is then removed by the cathode ray during succeeding scans of the picture field and is converted into the television image signal.

The tendency in the past few years has been to impose increasingly rigid limitations upon the fraction of the 1/60-second field scanning interval which can be utilized for vertical blanking and retrace. For example, the television standards generally accepted throughout the industry in this country formerly permitted 7½% of the field interval to be devoted to vertical retrace with an accuracy of plus or minus ½%; but recently this has been restricted to 5% plus 3% or minus 0%. The period of illumination of the film must be somewhat less than this to allow for some operating tolerances and to insure that the film is illuminated only within the vertical retrace interval.

If the conventional incandescent light source and mechanical shutter arrangement is used in the camera under these conditions, it becomes exceedingly difficult to maintain exact mechanical synchronism between the shutter and the television scanning action and, more serious, the greatly reduced periods of illumination require an increased intensity of illumination to maintain a satisfactory average image intensity, which cannot readily be secured from standard projection lamps.

In the copending application of Donald E. Norgaard, Serial No. 654,133, filed March 13, 1946, now U. S. Patent No. 2,483,149, issued September 27, 1949, and assigned to the same assignee as the present invention, there is disclosed a pulsed light motion picture projection system particularly adapted to a television film projection system, in which no mechanical shutter is required, and in which the film is illuminated from a gaseous discharge device which is pulsed in accurate synchronism with the television camera sweep and with the camera film drive mechanism, in order to provide short, high intensity, light flashes. The present invention has for one of its objects to provide an improved pulsed light projection system of this general type which is particularly satisfactory for operation under the more rigid, present-day television operating standards.

Another object of our invention is to provide an improved pulsed light projection system for producing short, sharp flashes of light of very accurately controlled position, duration and intensity.

Still another object of our invention is to provide a high intensity pulse illumination system, suitable for a film projector or the like, including means for supplying high intensity current pulses to a gas discharge gap lamp, together with means for shaping the current pulses and means for triggering these pulses to recur at very accurately controlled intervals of time.

Figure 3:
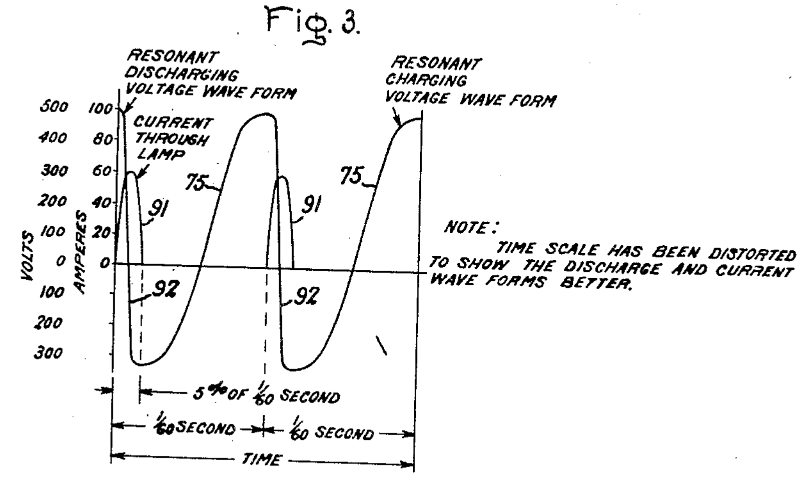
Figure 2:
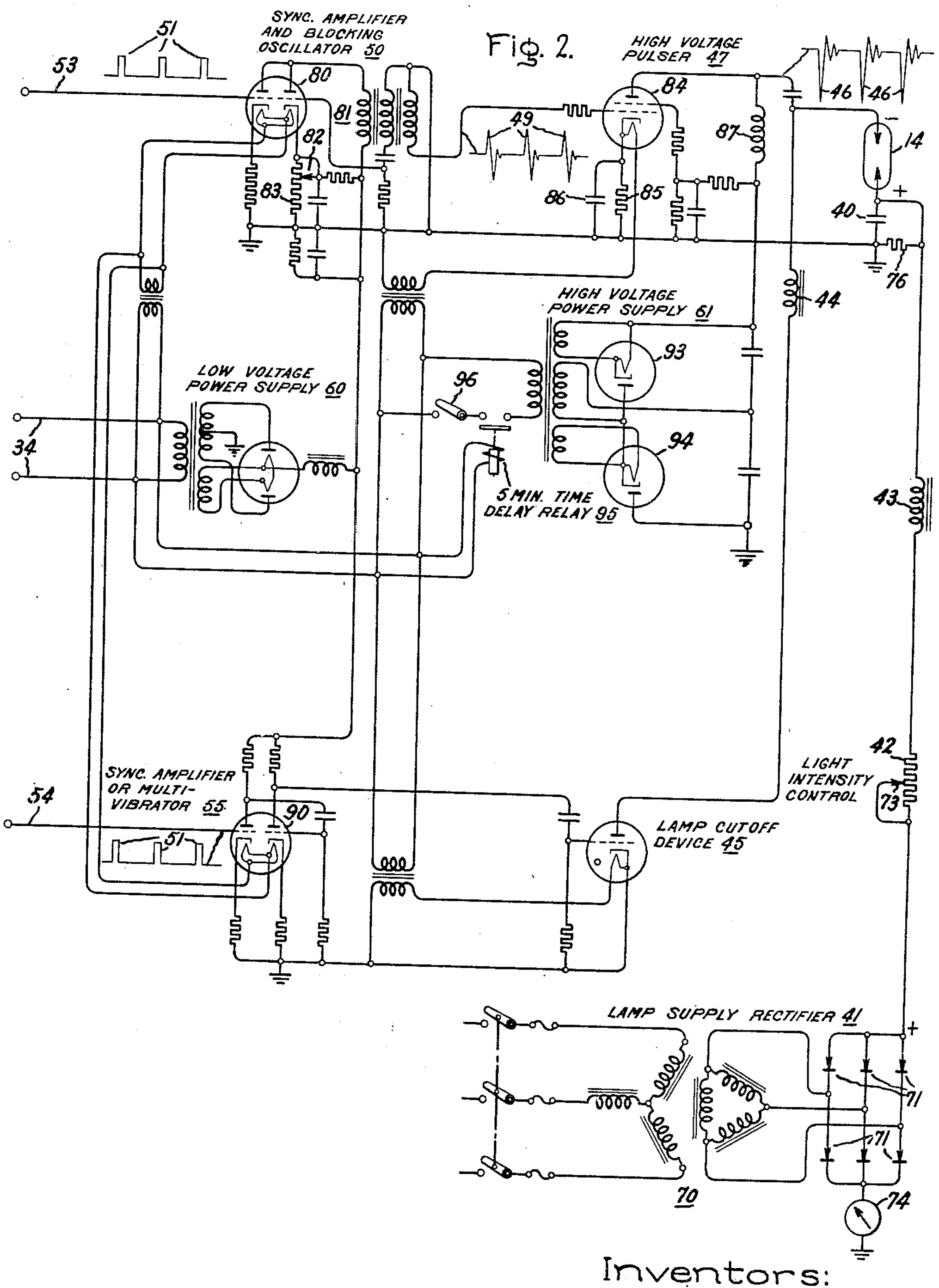

The features of our invention which we believe to be novel are set forth with particularity in the appended claims. Our invention itself, however, together with further objects and advantages thereof, may best be understood by reference to the following description taken in connection with the accompanying drawings, in which Fig. 1 is a simplified schematic representation of a motion picture television projection system embodying the invention; Fig. 2 is a detailed circuit diagram of the left-hand portion of Fig. 1, and Fig. 3 is a graphical representation of voltage and current waveforms (over an interval of two cycles) which will be referred to for a better understanding of the operation of our invention.

Referring now to Fig. 1 of the drawings, a motion picture projection apparatus is represented diagrammatically in which a motion picture film 10 is unwound from a reel 11 and rewound on a reel 12. During this operation the film passes in its travel through an aperture 13 where light is transmitted through it from a lamp 14. The film is also driven by means of sprockets 15 and 16, and by the intermittent drive mechanism 17. The sprockets 15 and 16 and the intermittent drive mechanism 17 are interconnected for operation by means of a synchronous motor 18 as indicated schematically by the dashed lines 19. The intermittent drive mechanism 17 also drives a third sprocket 20 which operates intermittently to pull the film in step by step fashion through a pair of pressure shoes 21 and 22. These pressure shoes each comprise a pair of members on opposite sides of the film to guide it across the aperture 13. Preferably, one of each of these pairs of members is fixed in position and the other is spring-biased against the film to produce a certain amount of friction, thereby to keep the film taut across the aperture 13 and to hold it in position when the film is stopped. The above-described mechanism is conventional in motion picture and television projection apparatus and requires no further explanation.

Light from the lamp 14 first passes through appropriate condensing lenses 23, then through the film at the aperture 13, and then through further objective lenses 24. An image of the film is thereby produced upon the photo-sensitive area 25 of a television camera pick-up tube 25′. In the illustrated embodiment of the invention, the camera tube 25′ is represented as of the cathode ray type commonly referred to as an iconoscope. All of the apparatus between the lamp 4 and the camera tube 25′ is likewise conventional apparatus commonly used in motion picture television projection equipment, and differs from conventional equipment only in that the mechanical shutters, normally utilized to interrupt the continuous light beam, are omitted.

As is well understood in the art, in the illustrated type of camera tube 25′, the surface 25 comprises elemental, photo - sensitive areas which become electrically charged when light falls thereon to an extent dependent upon the intensity of the light. Thus a "charge image" is produced. When the cathode ray beam impinges upon these elemental areas, such areas discharge, producing a beam current through a resistance 26 of intensity dependent upon the degree of light to which each elemental area is subjected. The voltage from this resistance 26 may be supplied to a conventional television transmitter for transmission in well known manner.

The camera tube 25′ is provided with the usual horizontal ray deflection coils 27 and vertical ray deflection coils 28. These coils are supplied with substantially sawtooth current waves from horizontal and vertical sweep generators 29 and 30, respectively. According to present television standards, the vertical sweep generator 30 produces a wave having a frequency of 60 cycles per second, and is synchronized from a pulse generator 31 over conductor 37. The horizontal sweep generator 29 operates at a much higher frequency, 15,750 cycles per second according to present standards, and is likewise controlled in frequency and in time phase relation to generator 30 from the synchronizing pulse generator 31 over conductor 38. The intensity control grid 32 of the camera tube 25′ is supplied with negative blanking pulses, according to conventional practice, during the horizontal and vertical retrace intervals from a blanking generator 33 which is likewise controlled from the synchronizing pulse generator 31.

The synchronizing pulse generator 31 is supplied with 60 cycle power, and synchronized therewith, preferably by connection through conductors 34 to one phase of a common three phase power supply, indicated by the bus conductors 35. The synchronous motor 18 is supplied from the same source 35 over conductors 36, thereby to synchronize the sweep voltages supplied to the cathode ray tube 26 with the intermittent motion of the film 10 across the aperture 13.

At the left hand portion of Fig. 1 are shown circuits for energizing the lamp 14 to project intense pulses of light through the aperture 13 during the intervals when the film is stationary therein. We have found in the actual practice of our invention that a very satisfactory type of lamp 14 is a gas-filled discharge lamp comprising a pair of pointed tungsten alloy electrodes sealed in a glass envelope filled with xenon gas at a pressure of about 600 mm. To give an idea of its size, one particular lamp which has been employed is about 6¾ inches long with a maximum diameter of about 1¼ inches. In this type of lamp a relatively high voltage is required in either direction to cause an arc to strike across the gap between the points of the electrodes, but once the gas is ionized, the arc may be maintained at a substantially lower voltage, providing sufficient current is supplied. The operation of this type of lamp involves three factors: (1) the gas between the electrodes must be broken down by or ionized in exact synchronism with the camera tube vertical sweep, (2) sufficient current must be supplied to maintain an intense arc or flash, and (3) the wave shape of the current must be controlled and the pulse cut off at the proper instant to provide a single light flash of maximum effect in each retrace interval.

In the apparatus illustrated in block form in Fig. 1, the power supply for the lamp 14 comprises a large capacitor 40, the upper terminal of which is charged to a predetermined positive potential, between flashes, from a lamp supply rectifier 41 through a variable resistor 42 and inductance 43, the functions of which will be described presently. The rectifier 41 may be energized from the three phase bus conductors 35 over conductors 39, as shown. A power discharge circuit through the lamp 14 for creating the light pulse or flash may be traced from the capacitor 40 through lamp 14, a second inductance 44 and a lamp cutoff device 45 to ground. However, the potential to which capacitor 40 is charged preceding each flash is normally insufficient to cause the lamp to fire. For example, in one particular installation, the capacitor 40 was charged to a maximum potential of about 600 volts.

The lamp 14 is accurately triggered by high voltage negative pulses supplied to the opposite electrode of lamp 14 from a high voltage pulser 47 through a coupling capacitor 48. As indicated, the output of the pulser 47 is a damped oscillatory voltage wave having high negative peaks 46. For example, in one embodiment of the invention these negative peaks were of about one micro-second duration with a peak value of approximately 5000 volts. The pulser 47 is driven by positive pulses 49 from a blocking oscillator 50, which is in turn synchronized by substantially rectangular pulses 51 over conductors 52 and 53. Pulses 51 are the same pulses supplied from the synchronizing pulse generator 31 to synchronize the vertical sweep generator 30. All of the pulses 46, 49, 51 recur at the 60 cycle vertical sweep rate.

The third factor in the operation of the lamp 14, i. e. that of shaping the current discharge wave and of cutting off the lamp at the proper instant, is accomplished by the elements 40, 44, 45 of the discharge circuit in a manner which will be presently described. For the present, it is sufficient to point out that the lamp cutoff device 45 is a normally inoperative, grid-controlled, discharge device which is simultaneously triggered on in response to the pulses 51 supplied over conductors 52 and 54 supplied to an intermediate synchronizing amplifier or multivibrator 55. The output of the amplifier or multivibrator 55 is adjusted to render the device 45 conducting at almost exactly the instants of time at which the pulses 46 trigger the lamp 14.

Suitable operating potentials for the elements 50 and 55 of Fig. 1 are indicated schematically as supplied by the low voltage power supply 60; and high voltage operating potentials for the pulser 47 are similarly indicated as supplied by the high voltage power supply 61. These power supplies may also be energized from the common supply conductors 34.

Reference is now made to Figs. 2 and 3 for a more detailed showing of the circuits for operating the discharge lamp 14 and description of their operation. To facilitate cross-reference, corresponding reference numerals have been placed on corresponding elements of the several figures of the drawings. Illustrative values of voltage and current have also been indicated in Fig. 3.

The lamp supply rectifier 41 is represented in Fig. 2 as a conventional three phase rectifier circuit employing a V-delta-connected supply transformer 70 and the rectifying elements 71. The latter are illustrated as being of the non-electronic type, e. g. selenium rectifiers, but they may be of any suitable type known to the art. The charging current supplied from the rectifier 41 to the capacitor 40 is regulated by the adjustment of tap 73 on resistor 42 and the average rectifier current may be read on ammeter 74. This determines the intensity of the light flashes from the lamp 14. In one particular embodiment of the invention, the average rectifier current ranged between about 1.5 and 2.5 amperes.

The inductance 43 and the capacitor 40 also constitute a resonant charging circuit in order to charge capacitor 40 to a considerably higher unidirectional potential than that of the rectifier 41. This circuit has a resonant frequency substantially lower than the frequency of the light pulses, or vertical scanning frequency. For example, in one embodiment of the invention, the resonant frequency of this charging circuit was between 30 and 40 cycles per second. This causes a resonant rise in voltage between flashes, having the wave shape of a fraction of a cycle, as indicated by the rising portions 75 of the voltage wave in Fig. 3. In this particular embodiment of the invention, a transformation of approximately 5 to 1 in voltage was realized by utilizing this resonant charging circuit, the output voltage of the rectifier 41 being approximately 130 volts and the maximum voltage applied to the upper terminal of capacitor 40 just prior to each discharge being approximately 600 volts. This voltage step-up is realized because the capacitor 40 starts charging from a negative voltage after each flash instead of from zero voltage, as indicated in Fig. 3. As previously mentioned, this voltage is insufficient to cause the discharge lamp 14 to fire. The operation of the charging circuit is not materially affected by the relatively high resistance 76 which is shunted across capacitor 40 to discharge the capacitor 40 when power is removed from the circuit.

As shown in Fig. 2, the synchronizing amplifier and blocking oscillator 50 comprises a dual triode 80. The left-hand section of this tube operates as a pulse amplifier for the 60 cycle synchronizing pulses 51 supplied to its grid over conductor 53. Its anode is connected directly to the anode of the right-hand triode section which, in conjunction with the three-winding transformer 81, functions as a well known form of blocking oscillator. The purpose of this oscillator is to provide the relatively sharp positive pulses 49 for triggering the high voltage pulser 47. Tap 82 on the cathode bias resistor 83 may be adjusted to cause the blocking oscillator to function only when the synchronizing pulses 51 are applied.

The high voltage pulser 47 is illustrated as comprising a screen grid tube 84 which is normally maintained substantially at cutoff by the relatively large cathode resistor 85, shunted by the usual bypass capacitor 86. The sharp positive pulses 49 supplied from the oscillator cause it to draw high current pulses, resulting in the highly negative voltage pulses 46 at its anode, which may for example have a value of minus 5000 volts and a duration of about 1 micro-second as previously explained. The anode coupling inductance 87, resonating with circuit capacities, results in a damped oscillatory type of discharge, as indicated.

Once the discharge lamp 14 has been triggered on by the pulses 46, a much lower value of voltage is required to maintain the arc, as previously explained. The wave shape of the discharge current from the capacitor 40 through the lamp 14 is controlled by the inductance 44 and the lamp cutoff device 45. The device 45 is represented as a three-electrode, gas-filled tube of the thyratron type. It is normally inoperative until it is rendered conducting by positive synchronizing pulses supplied to its grid from the synchronizing amplifier or multivibrator 55. As shown in Fig. 2, the latter comprises a dual triode 90 connected in a conventional multivibrator circuit and triggered by the vertical synchronizing pulses 51 supplied to the grid of the left-hand section over the conductor 54. In some cases it may be desirable to operate it as a driven pulse amplifier rather than a synchronized multivibrator. The control pulses may also optionally be applied to the conductor 54 from the upper end of the cathode resistor 83 of the blocking oscillator 50, rather than directly from the vertical synchronizing generator 31, as shown. As mentioned before, the circuits are so adjusted that positive triggering pulses are applied to the grid of the thyratron 45 at almost exactly the same instants as the lamp triggering pulses 46 are applied to the lamp 14.

In order to control the wave shape of the discharge current, and thereby the curve of light intensity against time, the value of inductance 44 is so selected that the discharge circuit is resonant at a frequency substantially higher than the light pulse frequency. This frequency is such that the first half cycle of the resonant discharge current wave will produce a light pulse whose total length is substantially equal to, or slightly less than, the percentage of the $^1/_{60}$-second ininterval available for vertical blanking and retrace, e. g. 4½ to 5% in the illustrated case. With a 60 cycle repetition rate, this corresponds to a frequency of approximately 600 cycles per second. Since the gap lamp 14 is capable of conducting in either direction so long as it remains ionized, the discharge current tends to be oscillatory and to produce a plurality of light pulses on successive half-cycles. However, the thyratron 45 carries the full discharge current and prevents current from flowing through the lamp 14 in the reverse direction during the negative swing of the resonant discharge cycle, thus insuring that only one light pulse will occur during each retrace interval. This results from the well known operating characteristic of a thyratron, i. e., its discharge will be extinguished as soon as the current goes to zero unless the grid is then positive. The peak current through the thyratron 45 will vary, depending upon the setting of the intensity control resistor 42. In one embodiment of the invention, it varied from about 40 to 70 amperes, for example.

The resultant current wave, and corresponding light pulse, approximates a half sine wave at the resonant discharge frequency. The shape of the current pulses is indicated at 91 in Fig. 3 and the corresponding voltage variation across the capacitor 40 is indicated by the sharply decreasing portions 92 of the voltage wave. The time base in Fig. 3 has been distorted in order to expand the curve during the discharge interval as compared to the remaining portion of each cycle, in order to show the wave shapes more clearly.

It has been found that a light pulse characteristic of the shape illustrated by the pulses 91 in Fig. 3 is especially suited to the operating characteristics of the iconoscope type of camera tube. The approximate sine wave shape of the pulse minimizes transient effects in the pick up tube as compared to a light pulse which has infinitely steep sides, or in other words, a pulse of generally rectangular shape.

The remaining elements of the circuits of Fig. 2 are entirely conventional and it is believed that their function will be apparent upon inspection without detailed explanation. The low voltage power supply 60 for the tubes 80 and 90 comprises a conventional full wave rectifier. The high voltage power supply 61 is illustrated as comprising a pair of diodes 93 and 94 connected in a conventional form of voltage doubling network to provide a relatively high anode voltage for the tube 84. The output voltage of the supply 61 may for example be of the order of 4000 volts. It need not be of high current capacity because it does not supply the lamp current. A five minute time delay relay 95 is also illustrated in the supply circuit for the high voltage rectifier 61 in order to allow sufficient heating time for the tube filaments, when switch 96 is closed, before the high voltage is applied to the anode of the pulser 84.

It will thus be apparent that we have provided a pulsed light system which is particularly adapted to the requirements of television film projection and which possesses many advantages over prior art systems. In addition to the advantages previously pointed out, the system greatly reduces mechanical wear, noise, vibration and driving power in the projector, as compared to prior systems utilizing mechanical shutters. Since a powerful continuous light source is no longer required, the power requirements for the lamp supply system are greatly reduced, also. For example, in one form of the equipment, the total power requirement of the system was less than half that required alone for the thousand watt projector lamp which is often employed as a light source in projectors. Another important advantage is that the temperature at the aperture 13 is low, greatly reducing the danger from fire. The film may be framed and focused with the light in operation without danger of burning.

While we have shown a particular embodiment of our invention, and have suggested certain illustrative values of circuit constants, it will of course be understood that we do not wish to be limited thereto since various modifications will readily occur to those skilled in the art, and we contemplate by the appended claims to cover any such modifications as fall within the true spirit and scope of our invention.

What we claim as new and desire to secure by Letters Patent of the United States is:

1. In a motion picture television projection system of the type wherein images from a moving picture film are recurrently projected upon a cathode ray camera tube in synchronism with sweep waves applied to ray deflecting circuits thereof, the combination of a gaseous discharge gap lamp for illuminating said film, power supply means for impressing potentials on said lamp insufficient to cause it to fire, a first pulse triggering means for recurrently applying a high potential pulse to said lamp sufficient to cause it to fire, an oscillatory discharge circuit serially including said power supply, said lamp and a normally nonconducting unilateral discharge device, said circuit having a predetermined natural period of oscillation, a second pulse triggering means for recurrently rendering said discharge device conducting for a time interval not exceeding half said natural period, and means for synchronizing the operation of both said triggering means with said sweep waves.

2. In a motion picture television projection system of the type wherein a moving film is recurrently illuminated in synchronism with the sweep waves supplied to the deflecting circuits of a camera pickup tube, the combination of a gas discharge lamp for illuminating said film, a resonant power supply circuit serially including said lamp, a source of operating potential and a normally non-conducting gas-filled unilateral discharge device having a control electrode, the current in said circuit tending to oscillate at a predetermined frequency when said lamp and device are conducting, means for concurrently applying triggering potential pulses to said lamp and to said electrode to initiate said oscillatory current flow in said circuit, said device again becoming non-conductive and interrupting said current at the end of the first half cycle thereof, and means for synchronizing said pulses with said sweep waves.

3. In a high intensity pulse illumination system for a film projector or the like, the combination of a bilaterally conducting gas-filled gap lamp, an oscillatory discharge circuit serially comprising said lamp, a capacitor and a normally non-conducting unilateral discharge device, said circuit having a predetermined natural frequency of oscillation, power supply means for charging said capacitor to a unidirectional potential insufficient to fire said lamp, pulse triggering means for synchronously rendering both said lamp and said device conducting to produce an intense light flash resulting from discharge of said capacitor through said lamp and device, and means for restoring said discharge device to non-conductive condition within the first half-cycle of oscillation of said current.

4. In a high intensity pulse illumination system for a film projector or the like wherein a moving film is recurrently illuminated by light pulses at a predetermined frequency, the combination of a gas discharge bilaterally-conducting gap lamp for illuminating said film, a resonant discharge circuit serially including said lamp and a capacitor, said discharge circuit resonating at a frequency above said predetermined frequency, a triggering circuit for impressing high voltage pulses on said lamp and capacitor which recur at said frequency, a resonant charging circuit including said capacitor and a unidirectional potential source, said charging circuit resonating at a frequency below said predetermined frequency and providing a resonant rise in voltage upon said capacitor above the potential of said source, said voltage being insufficient to trigger said lamp except when said pulses are applied, and means in said discharge circuit for extinguishing said lamp when the capacitor discharge current first goes to zero after application of each pulse.

5. In a high intensity pulse illumination system for a film projector or the like wherein a moving film is recurrently illuminated by light pulses at a predetermined frequency, the combination of a bilaterally-conducting gas discharge gap lamp for illuminating said film, a capacitor, a resonant discharge circuit including said lamp and capacitor and having a resonant frequency higher than said predetermined frequency, a resonant charging circuit including said capacitor and a source of unidirectional potential and having a resonant frequency lower than said predetermined frequency, a triggering circuit for impressing recurrent high voltage pulses upon said lamp and capacitor at said predetermined frequency and in a polarity to initiate discharge of said capacitor through said lamp, said charging circuit providing a resonant rise in voltage on said capacitor above the potential of said source after each applied pulse, said voltage being insufficient to trigger said lamp except when said pulses occur, said discharge circuit providing an oscillatory current wave through said lamp having substantially the periodicity of said higher frequency, and means in said discharge circuit for extinguishing said wave at the end of the first half-cycle thereof.

6. In a motion picture television projection system of the type wherein images from a moving film are recurrently projected upon a cathode ray camera scanning tube during the interval of vertical retrace, the combination of a bilaterally-conducting gas discharge gap lamp for illuminating said film, a power supply circuit including a capacitor and means for charging said capacitor to a potential less than that required to cause said lamp to fire, a resonant discharge circuit serially including said lamp, said capacitor and an inductance, means for impressing triggering pulses of high potential upon said lamp at the frequency of vertical retrace and synchronized with said retrace intervals, said pulses adding to said potential and causing said capacitor to discharge through said lamp, said capacitor and inductance resonating at a high frequency relative to said retrace frequency to provide an oscillatory form of discharge wave through said device in which one-half cycle is substantially less than the retrace interval, and means in said discharge circuit for extinguishing said wave at the end of the first half-cycle thereof.

7. In a motion picture television projection system of the type wherein images from a moving film are recurrently projected upon a cathode ray camera scanning tube during the interval of vertical retrace, the combination of a bilaterally-conducting gas discharge gap lamp for illuminating said film, a power supply circuit and a source of unidirectional charging potential, means for generating triggering pulses at the frequency of vertical retrace and synchronized with said intervals, a resonant discharge circuit including said lamp and said capacitor, means for impressing said pulses upon said circuit to initiate an oscillatory discharge of said capacitor through said lamp, said discharge circuit having a resonant frequency for which the period of one-half cycle is less than said retrace interval, and means in said discharge circuit for extinguishing said lamp when the capacitor discharge current first goes to zero after application of each pulse.

8. In a high intensity pulse illumination system for a film projector or the like, a bilaterally-conducting gas discharge lamp, an oscillatory discharge circuit serially comprising said lamp, a capacitor and a normally non-conductive unilateral discharge device, power supply means for charging said capacitor to a predetermined potential, pulse triggering means for synchronously supplying short voltage pulses to both said lamp and said device to render them conductive, thereby to initiate an oscillatory discharge of said capacitor through said circuit and to produce an intense light flash from said lamp, and means for restoring said device to non-conductive condition at the end of the first half-cycle of said oscillatory discharge.

LLOYD C. DOWNES.
JOSEPH F. WIGGIN.

REFERENCES CITED

The following references are of record in the file of this patent:

UNITED STATES PATENTS

| Number | Name | Date |
|---|---|---|
| 1,927,474 | Treicksess | Sept. 19, 1933 |
| 2,186,013 | Edgerton | Jan. 9, 1940 |
| 2,226,108 | Schlesinger | Dec. 24, 1940 |
| 2,274,709 | Knoop | Mar. 3, 1942 |
| 2,275,898 | Goldsmith | Mar. 10, 1942 |
| 2,343,971 | Goldsmith | Mar. 14, 1944 |

FOREIGN PATENTS

| Number | Country | Date |
|---|---|---|
| 6,051 | Great Britain | Mar. 10, 1914 |
| 777,409 | France | Feb. 20, 1935 |
| 502,051 | Great Britain | Mar. 10, 1939 |